(12) United States Patent
Kuznicki et al.

(10) Patent No.: US 6,340,433 B1
(45) Date of Patent: Jan. 22, 2002

(54) WATER PURIFICATION USING TITANIUM SILICATE MEMBRANES

(75) Inventors: Steven M. Kuznicki, Whitehouse Station; Richard M. Jacubinas, Somerville; Jacqueline S. Curran, Cranford; Valerie A. Bell, Edison, all of NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/663,828

(22) Filed: Sep. 15, 2000

(51) Int. Cl.[7] ............................................. B01D 61/00
(52) U.S. Cl. ..................... 210/651; 210/640; 210/650; 210/500.25; 95/45; 95/52; 96/6
(58) Field of Search ................. 210/640, 651, 210/650, 500.25, 500.26; 95/45, 46, 52; 96/6; 427/435, 247; 502/60, 65, 70; 423/326

(56) References Cited

U.S. PATENT DOCUMENTS

| | | |
|---|---|---|
| 4,699,892 A * | 10/1987 | Suzuki |
| 4,853,202 A | 8/1989 | Kuznicki |
| 4,938,939 A | 7/1990 | Kuznicki |
| 5,011,591 A * | 4/1991 | Kuznicki |
| 5,019,263 A | 5/1991 | Haag et al. |
| 5,069,794 A | 12/1991 | Haag et al. |
| 5,100,596 A | 3/1992 | Haag et al. |
| 5,244,650 A | 9/1993 | Kuznick et al. |
| 5,346,535 A | 9/1994 | Kuznicki et al. |
| 5,362,522 A * | 11/1994 | Barri et al. |
| 5,413,975 A * | 5/1995 | Mueller et al. |
| 5,712,402 A * | 1/1998 | Pinnavaia et al. |
| 5,882,624 A * | 3/1999 | Kuznicki et al. |
| 5,968,366 A * | 10/1999 | Deckman et al. |
| 5,989,316 A | 11/1999 | Kuznicki et al. |
| 6,001,257 A * | 12/1999 | Bratton et al. |
| 6,068,682 A | 5/2000 | Kuznick et al. |
| 6,106,797 A * | 8/2000 | Mueller et al. |
| 6,110,378 A * | 8/2000 | Anthony et al. |
| 6,140,263 A * | 10/2000 | Anstett et al. |

* cited by examiner

Primary Examiner—Ana Fortuna
(74) Attorney, Agent, or Firm—Stephen I. Miller

(57) ABSTRACT

Aqueous streams containing organic and/or inorganic contaminants are purified by the removal of the contaminant by contacting the aqueous stream with a membrane formed from a porous, crystalline titanium silicate.

20 Claims, 2 Drawing Sheets

WATER PURIFICATION USING TITANIUM SILICATE MEMBRANES

FIELD OF THE INVENTION

This invention relates to processes for liquid-liquid separation utilizing membranes formed from crystalline titanium silicate molecular sieves. Removal of contaminant organic and inorganic species from aqueous streams is advantageously achieved.

BACKGROUND OF THE INVENTION

Since the discovery by Milton and coworkers (U.S. Pat. Nos. 2,882,243 and 2,882,244) in the late 1950's that aluminosilicate systems could be induced to form uniformly porous, internally charged crystals, analogous to molecular sieve zeolites found in nature, the properties of synthetic aluminosilicate zeolite molecular sieves have formed the basis of numerous commercially important catalytic, adsorptive and ion-exchange applications. This high degree of utility is the result of a unique combination of high surface area and uniform porosity dictated by the "framework" structure of the zeolite crystals coupled with the electrostatically charged sites induced by tetrahedrally coordinated $Al^{+3}$. Thus, a large number of "active" charged sites are readily accessible to molecules of the proper size and geometry for adsorptive or catalytic interactions. Further, since charge compensating cations are electrostatically and not covalently bound to the aluminosilicate framework, they are generally base exchangeable for other cations with different inherent properties. This offers wide latitude for modification of active sites whereby specific adsorbents and catalysts can be tailor-made for a given utility.

In the publication "Zeolite Molecular Sieves", Chapter 2, 1974, D. W. Breck hypothesized that perhaps 1,000 aluminosilicate zeolite framework structures are theoretically possible, but to date only approximately 150 have been identified. While compositional nuances have been described in publications such as U.S. Pat. Nos. 4,524,055; 4,603,040; and 4,606,899, totally new aluminosilicate framework structures are being discovered at a negligible rate.

With slow progress in the discovery of new aluminosilicate based molecular sieves, researchers have taken various approaches to replace aluminum or silicon in zeolite synthesis in the hope of generating either new zeolite-like framework structures or inducing the formation of qualitatively different active sites than are available in analogous aluminosilicate based materials.

It has been believed for a generation that phosphorus could be incorporated, to varying degrees, in a zeolite type aluminosilicate framework. In the more recent past (JAC 104, pp. 1146 (1982); proceedings of the $7^{th}$ International Zeolite Conference, pp. 103–112, 1986) E. M. Flanigan and coworkers have demonstrated the preparation of pure aluminophosphate based molecular sieves of a wide variety of structures. However, the site inducing $Al^{+3}$ is essentially neutralized by the $p_{+5}$, imparting a +1 charge to the framework. Thus, while a new class of "molecular sieves" was created, they are not zeolites in the fundamental sense since they lack "active" charged sites.

Realizing this inherent utility limiting deficiency, for the past few years the research community has emphasized the synthesis of mixed aluminosilicate-metal oxide and mixed aluminophosphate-metal oxide framework systems. While this approach to overcoming the slow progress in aluminosilicate zeolite synthesis has generated approximately 200 new compositions, all of them suffer either from the site removing effect of incorporated $P^{+5}$ or the site diluting effect of incorporating effectively neutral tetrahedral +4 metal into an aluminosilicate framework. As a result, extensive research has failed to demonstrate significant utility for any of these materials.

A series of zeolite-like "framework" silicates have been synthesized, some of which have larger uniform pores than are observed for aluminosilicate zeolites. (W. M. Meier, Proceedings of the $7^{th}$ International Zeolite Conference, pp. 13–22 (1986)). While this particular synthesis approach produces materials which, by definition, totally lack active, charged sites, back implantation after synthesis would not appear out of the question although little work appears in the open literature on this topic.

Another and most straightforward means of potentially generating new structures or qualitatively different sites than those induced by aluminum would be the direct substitution of some charge inducing species for aluminum in a zeolite-like structure. To date the most notably successful example of this approach appears to be boron in the case of ZSM-5 analogs, although iron has also been claimed in similar materials. (EPA 68,796 (1983), Taramasso, et. al.; Proceedings of the $5^{th}$ International Zeolite Conference; pp. 40–48 (1980)); J. W. Ball, et. al.; Proceedings of the $7^{th}$ International Zeolite Conference; pp. 137–144 (1986); U.S. Pat. No. 4,280,305 to Kouenhowen, et. al. Unfortunately, the low levels of incorporation of the species substituting for aluminum usually leaves doubt if the species are occluded or framework incorporated.

In 1967, Young in U.S. Pat. No. 3,329,481 reported that the synthesis of charge bearing (exchangeable) titaniumsilicates under conditions similar to aluminosilicate zeolite formation was possible if the titanium was present as a "critical reagent" +III peroxo species. While these materials were called "titanium zeolites" no evidence was presented beyond some questionable X-ray diffraction (XRD) patterns and his claim has generally been dismissed by the zeolite research community. (D. W. Breck, Zeolite Molecular Sieves, p. 322 (1974); R. M. Barrer, Hydrothermal Chemistry of Zeolites, p. 293 (1982); G. Perego, et. al., Proceedings of $7^{th}$ International Zeolite conference, p. 129 (1986)). For all but one end member of this series of materials (denoted TS materials), the presented XRD patterns indicate phases too dense to be molecular sieves. In this case of the one questionable end member (denoted TS-26), the XRD pattern might possibly be interpreted as a small pored zeolite, although without additional supporting evidence, it appears extremely questionable.

A naturally occurring alkaline titanosilicate identified as "Zorite" was discovered in trace quantities on the Siberian Tundra in 1972 (A. N. Mer'kov, et. al.; Zapiski Vses Mineralog. Obshch., pp. 54–62 (1973)). The published XRD pattern was challenged and a proposed structure reported in a later article entitled "The OD Structure of Zorite", Sandomirskii, et. al., Sov. Phys. Crystallogr. 24(6), November–December 1979, pp. 686–693.

No further reports on "titanium zeolites" appeared in the open literature until 1983 when trace levels of tetrahedral Ti(IV) were reported in a ZSM-5 analog. (M. Taramasso, et. al.; U.S. Pat. No. 4,410,501 (1983); G. Perego, et. al.; Proceedings of the $7^{th}$ International Zeolite Conference; p. 129 (1986)). A similar claim appeared from researchers in mid-1985 (EPA 132,550 (1985)). The research community reported mixed aluminosilicate-titanium (IV) (EPA 179,876 (1985); EPA 181,884 (1985) structures which, along with TAPO (EPA 121,232 (1985) systems, appear to have no possibility of active titanium sites. As such, their utility has been limited to catalyzing oxidation.

In U.S. Pat. No. 4,938,939, issued Jul. 3, 1990, Kuznicki disclosed a new family of synthetic, stable crystalline titanium silicate molecular sieve zeolites, which have a pore size of approximately 3–4 Angstrom units and a titania/silica mole ratio in the range of from 1.0 to 10. The entire content of U.S. Pat. No. 4,938,939 is herein incorporated by reference. Members of the family of molecular sieve zeolites designated ETS-4 in the rare earth-exchanged form have a high degree of thermal stability of at least 450° C. or higher depending on cationic form, thus rendering them effective for use in high temperature catalytic processes. ETS zeolites are highly adsorptive toward molecules up to approximately 3–5 Angstroms in critical diameter, e.g. water, ammonia, hydrogen sulfide, $SO_2$, and n-hexane and are essentially non-adsorptive toward molecules, which are larger than 5 Angstroms in critical diameter.

A large pore crystalline titanium silicate molecular sieve composition having a pore size about 8 Angstrom units has also been developed by the present assignee and is disclosed in U.S. Pat. No. 4,853,202, which patent is herein incorporated by reference. This crystalline titanium silicate molecular sieve has been designated ETS-10.

The new family of microporous titanium silicates developed by the present assignee, and generically denoted as ETS, are constructed from fundamentally different building units than classical aluminosilicate zeolites. Instead of interlocked tetrahedral metal oxide units as in classical zeolites, the ETS materials are composed of interlocked octahedral chains and classical tetrahedral rings. In general, the chains consist of six oxygen-coordinated titanium octahedra and wherein the chains are connected three dimensionally via tetrahedral silicon oxide units or bridging titanosilicate units. The inherently different crystalline titanium silicate structures of these ETS materials have been shown to produce unusual and unexpected results when compared with the performance of aluminosilicate zeolite molecular sieves. For example, the counter-balancing cations of the crystalline titanium silicates are associated with the charged titania chains and not the uncharged rings, which form the bulk of the structure. In ETS-10, this association of cations with the charged titania chains is widely recognized as resulting in the unusual thermodynamic interactions with a wide variety of sorbates, which have been found. This includes relative weak binding of polar species such as water and carbon dioxide and relatively stronger binding of larger species, such as propane and other hydrocarbons. These thermodynamic interactions form the heart of low temperature desiccation processes as well as evolving Claus gas purification schemes. The unusual sorbate interactions are derived from the titanosilicate structure, which places the counter-balancing cations away from direct contact with the sorbates in the main ETS-10 channels.

In recent years, scores of reports on the structure, adsorption and, more recently, catalytic properties of wide pore, thermally stable ETS-10 have been made on a worldwide basis. This worldwide interest has been generated by the fact that ETS-10 represents a large pore thermally stable molecular sieve constructed from what had previously been thought to be unusable atomic building blocks.

Although ETS-4 was the first molecular sieve discovered which contained the octahedrally coordinated framework atoms and as such was considered an extremely interesting curiosity of science, ETS-4 has been virtually ignored by the world research community because of its small pores and reported low thermal stability. As synthesized, ETS-4 has an approximately 4 Å effective pore diameter. Reference to pore size or "effective pore diameter" defines the effective diameter of the largest gas molecules significantly adsorbed by the crystal. This may be significantly different from, but systematically related to, the crystallographic framework pore diameter. For ETS-4, the effective pore is defined by eight-membered rings formed from $TiO_6^{2-}$ octahedra and $SiO_4$ tetrahedra. This pore is analogous to the functional pore defined by the eight-membered tetrahedral metal oxide rings in traditional small-pored zeolite molecular sieves.

The pores of ETS-4 formed by the eight-membered polyhedral $TiO_6$ and $SiO_4$ units are non-faulted in a singular direction, the b-direction, of the ETS crystal and, thus, fully penetrate the crystal, rendering the ETS-4 useful for molecular separations. Recently, however, researchers of the present assignee have discovered a new phenomenon with respect to ETS-4. In appropriate cation forms, the pores of ETS-4 can be made to systematically shrink from slightly larger than 4 Å to less than 3 Å during calcinations, while maintaining substantial sample crystallinity. These pores may be "frozen" at any intermediate size by ceasing thermal treatment at the appropriate point and returning to ambient temperature. These materials having controlled pore sizes are referred to as CTS-1 (contracted titanosilicate-1) and are described in commonly assigned U.S. Pat. No. 6,068,682, issued May 30, 2000 herein incorporated by reference in its entirety. Thus, ETS-4 may be systematically contracted under appropriate conditions to CTS-1 with a highly controllable pore size in the range of 3 –4 Å. With this extreme control, molecules in this range may be separated by size, even if the sizes of the respective molecules are nearly identical. This profound change in adsorptive behavior is accompanied by systematic structural changes as evidenced by X-ray diffraction patterns and infrared spectroscopy. The systematic contraction of ETS-4 to CTS-1 to a highly controllable pore size has been named the Molecular Gate™ effect. This effect is leading to the development of separation of molecules differing in size by as little as 0.1 Angstrom, such as $N_2/O_2$ (3.6 and 3.5 Angstroms, respectively), $CH_4/N_2$ (3.8 and 3.6 Angstroms), or $CO/H_2$ (3.6 and 2.9 Angstroms). High pressure $N_2/CH_4$ separation systems are now being developed.

Separations of fluid mixtures (gases or liquids) by adsorption utilizing the ETS-type molecular sieves have been proposed in which the molecular sieve is utilized in the form of a bed, typically fixed, through which the mixture to be separated flows. Both pressure swing adsorption (PSA) and thermal swing adsorption (TSA) have been suggested to effect separation of one or more fluids from mixtures containing same. Presently suggested separations using ETS molecular sieve adsorbents include the use of ETS-10 to adsorb hydrocarbon species from a Claus feed gas also containing hydrogen sulfide and other polar gases. In such process, the ETS-10 adsorbent is regenerated by a temperature swing (TSA) causing desorption of the hydrocarbons. Also proposed by the present assignee is the use of ETS-4 and contracted versions thereof, CTS-1, in a high pressure separation of nitrogen from natural gas. In this latter system, pressure swing adsorption (PSA) is utilized to adsorb the nitrogen from the natural gas stream, and desorb the nitrogen from the titanium silicate molecular sieve.

The unique property of ETS-10 to only weakly bind polar species so as to cause polar species to pass through the adsorbent at mildly elevated temperatures, and the ability to actually control and systematically shrink the pore size of ETS-4 to its CTS version have played significantly in allowing high capacity, fixed bed separation systems to be developed utilizing these titanium silicate molecular sieves. One disadvantage, however, of the PSA and TSA systems is that the adsorbent beds quickly reach the sorbent capacities thereof resulting in a "breakthrough" of the sorbate into the product stream. An additional disadvantage of these processes is that at elevated temperatures, the adsorbent bed loses its capacity to hold the sorbate, resulting in the contamination of the product stream as the non-adsorbed sorbate passes through the spaces between the individual particles of the molecular sieve and breaks through into the product. Heating, however, is often advantageous to improve the kinetics of the adsorption process. Accordingly, adsorption undertaken in the presence of a bed of molecular sieve operates under multiple timed cycles of adsorption and desorption to prevent over-reaching the capacity of the adsorbent and consequent breakthrough of the sorbate into the product during adsorption, and contamination of the sorbate by product fronts during desorption. On a daily basis, many of such adsorption/desorption cycles must be run. Typically, multiple beds of molecular sieve are used, operating in parallel, some of which are undergoing adsorption while others undergo desorption or intermediate pressurizations and depressurizations if a PSA system is utilized. The need for multiple cycles and/or multiple beds obviously requires a high capital investment for production of a significant volume of product such as on a commercial scale. Moreover, such systems have high maintenance costs.

The use of membranes to provide fluid separation of mixtures is a known alternative to the use of beds of molecular sieves and use thereof in PSA or TSA processes. The membrane separation process is rather straight forward and does not require the timed cycles of adsorption and desorption needed with fixed bed molecular sieve technology. In membrane applications, small molecules (permeate) are not adsorbed but simply pass across the plane of the membrane through distinctly sized pores. The larger sized molecules (retentate) cannot pass through the pores and are retained upstream of the membrane plane. Accordingly, there is no adsorbent over-capacity problem and consequent breakthrough of retentate into product, and, thus, no need for timed cycles. There are, however, disadvantages to membrane technology. For one, while advances in polymer membranes have been made, these materials are still subject to chemical destabilization and are not universally inert to all fluid mixtures. Even water present can degrade many such membranes. Zeolite crystalline aluminosilicates with a narrow distribution of pore sizes on a molecular scale have high thermal, chemical, and mechanical stabilities. Molecular sieves can be, for example, alumina phosphates (ALPO) or silicoaluminophosphates (SAPO), which are also microporous, crystalline materials with a narrow distribution of pore sizes and also have high thermal, chemical, and mechanical stabilities. Therefore, zeolites and molecular sieves can be used in bed form not only for fluid separations in adsorption/desorption processes, as mentioned above, but also as diffusion membranes when prepared in thin film form. The size and adsorption properties of the zeolite pores, however, limit what can be separated with a particular type of zeolite membrane, even if the crystalline structure is perfect and defect free. Zeolite membranes are further problematic with respect to polar species, which are strongly held within the charged structure of the zeolite pores. Thus, fluid mixtures containing water, $CO_2$, etc. can adversely affect membrane productivity. The simplification and, thus, lower capital and operational costs of separations utilizing membranes, however, wherein the permeate and retentate are continuously separated is a large factor in the continued development of membrane separations.

SUMMARY OF THE INVENTION

In accordance with this invention, separation of components from gaseous or liquid mixtures containing same is provided by contacting the mixtures with membranes formed from titanium silicate molecular sieves, including the ETS molecular sieves developed by Engelhard Corporation. The ETS sieves are distinguished from other molecular sieves by possessing octahedrally coordinated titania active sites in the crystalline structure. These molecular sieves contain electrostatically charged units that are radically different from charged units in conventionally tetrahedrally coordinated molecular sieves such as in the classic aluminosilicate zeolites. Members of the ETS family of sieves include, by way of example, ETS-4 (U.S. Pat. No. 4,938,939), ETS-10 (U.S. Pat. No. 4,853,202), and ETAS-10 (U.S. Pat. No. 5,244,650), all of which are titanium silicates or titanium aluminum silicates. The disclosures of each of the listed patents are incorporated herein by reference.

Membranes formed from ETS-4 molecular sieve are particularly useful inasmuch as the pores of the ETS-4 membranes can be systematically contracted under thermal dehydration to form CTS-1-type materials as disclosed in U.S. Pat. No. 6,068,682. Under thermal dehydration, the pore size of ETS-4 can be systematically controlled from about 4 Å to 2.5 Å and sizes therebetween and frozen at the particular pore size by ending the thermal treatment and returning the molecular sieve to ambient temperature. The ability to actually control the pore size of a particular molecular sieve greatly increases the number of separations achievable by a single molecular sieve unlike previous zeolite membranes in which the adsorption and diffusion properties of the zeolite pores limit what can be separated with a particular type of zeolite membrane. It has recently been discovered that certain polymorphs of ETS-4 can be prepared which not only contain the open small pores along the b-axis of the crystallographic lattice, which characterize ETS-4, but which further contain larger pores which are open and interpenetrate the lattice in the c-direction. Controlled shrinkage of these larger pores further increases the number of molecules which an be separated by this polymorph-enriched ETS-4. This material has been called ETS-6 and is the subject of co-pending application U.S. Ser. No. 09/640,313.

The titanium silicate membranes of this invention can be prepared by methods known in the art, such as by processes used for preparing aluminosilicate zeolite membranes. Novel methods of forming the membranes are also disclosed.

DETAILED DESCRIPTION OF THE INVENTION

Figure 1:
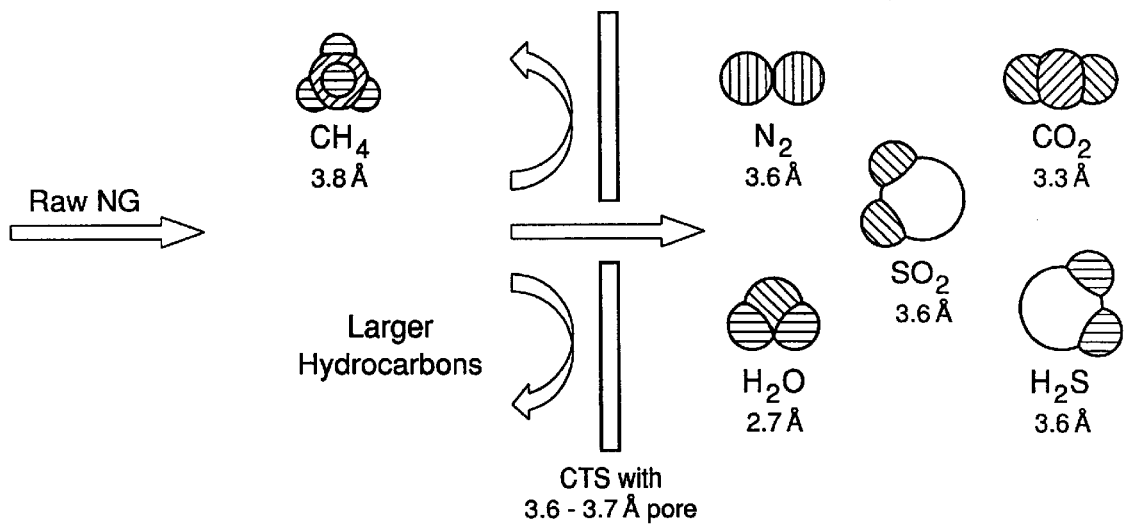
FIG. 1 is a depiction of a process using titanium silicate membranes for separating nitrogen from natural gas.

It is preferred to use as the titanium silicate material which is formed into membranes of this invention, ETS-4, and more preferably, contracted versions of ETS-4, known as CTS-1. ETS-4 titanium silicates have a definite X-ray diffraction pattern unlike other molecular sieve zeolites and can be identified in terms of mole ratios of oxides as follows:

$$1.0\pm0.25M_{2/n}O:TiO_2:ySiO_2:zH_2O$$

wherein M is at least one cation having a valence of n, y is from 1.0 to 10.0, and z is from 0 to 100. In a preferred embodiment, M is a mixture of alkali metal cations, particularly sodium and potassium, and y is at least 2.5 and ranges up to about 5. The original cations M can be replaced at least in part with other cations by well-known exchange techniques. Preferred replacing cations include hydrogen, ammonium, alkaline earth, rare earth, and mixtures thereof.

Members of the ETS-4 molecular sieve zeolites have an ordered crystalline structure and an X-ray powder diffraction pattern having the following significant lines:

TABLE 1

XRD PQWDER PATTERN OF ETS-4
(0–40° 2 theta)

| SIGNIFICANT d-SPACING (ANGS.) | I/I$_0$ |
|---|---|
| 11.65 ± 0.25 | S-VS |
| 6.95 ± 0.25 | S-VS |
| 5.28 ± 0.15 | M-S |
| 4.45 ± 0.15 | W-M |
| 2.98 ± 0.05 | vS |

In the above table,
VS = 50–100
S = 30–70
M = 15–50
W = 5–30

The above values were collected using standard techniques on a Phillips APD3720 diffractometer equipped with a theta compensator as described by aforementioned U.S. Pat. No. 4,938,939, incorporated by reference.

As disclosed in commonly assigned U.S. Pat. No. 6,086,682, it has been discovered that ETS-4 can be transformed into CTS-1 by the heating of ETS-4, preferably in the strontium or calcium form with or without low levels of sodium, at temperatures ranging from about 50° C. to 450° C., or preferably 200° C. to 350° C. for strontium and/or calcium mixed with sodium for 0.5 to 100 or more hours, preferably 24–48 hours, then cooling the thus treated material in order to lock in the desired pore size. The manner of cooling is not critical and it can be accomplished in air, vacuum or inert gas either slowly or rapidly. The calcination temperature used to achieve a desired pore diameter depends on the cations present in the reagent ETS-4. Although multivalent strontium and calcium are the preferred cations for CTS-1 for natural gas separations, other cations can be used with appropriate changes of temperature and duration of thermal treatment. Various combinations of Sr, Ca, Li, Mg, Na, H, Ba, Y, La, and/or Zn have all demonstrated N$_2$/CH$_4$ selectivities.

Although the novel materials of this invention have been prepared from the calcium and strontium form of ETS-4, there is no theoretical reason why other cations could not be used with appropriate changes of temperature and duration of thermal treatment. Additionally, the CTS-1 materials can be back-exchanged with metal, ammonium or hydrogen ions in a conventional manner if such is desired.

The crystalline titanium molecular sieves hereafter referred to as CTS-1, have a pore size of about 3–4 Å and have a composition in terms of mole ratio of oxides as follows:

$$1.0\pm0.25M_{2/n}O:TiO_2:ySiO_2:zH_2O$$

where M is at least 1 cation having a valence n, y is 1–10 and z is from 0–10 and more preferably 0–5, and characterized by an X-ray powder diffraction pattern having the lines and relative intensity set forth in Table 2 below.

TABLE 2

XRD POWDER PATTERN OF CTS-1
(0–40° 2 theta)

| SIGNIFICANT d-SPACING (ANGS.) | I/I$_0$ |
|---|---|
| 11.4 ± 0.25 | Very Strong |
| 6.6 ± 0.2 | Medium-Strong |
| 4.3 ± 0.15 | Medium-Strong |
| 3.3 ± 0.07 | Medium-Strong |
| 2.85 ± 0.07 | Medium-Strong | wherein very strong equals 100, medium-strong equals 15–80.

A particularly useful titanium silicate is ETS-4 which is enriched with one or two polymorphs having small pores interpenetrating the crystallographic b-axis of ETS-4 and larger pores (6 Å) interpenetrating the crystallographic c-axis. This material has been given the name ETS-6 and has a composition in terms of mole ratios of oxides as follows:

$$1.0+0.25M_{2/n}O:TiO_2:ySiO_2:zH_2O$$

wherein M is at least one cation having a valence of n, y is from 1.0 to 100, and z is from 0 to 100 and characterized by an X-ray powder diffraction pattern having the lines and relative intensities set forth in Table 3 below:

TABLE 3

XRD POWDER PATTERN OF ETS-6
(0–40° 2 theta)

| SIGNIFICANT d-SPACING (ANGS.) | I/I$_0$ |
|---|---|
| 12.50 ± 0.25 | W-M |
| 11.65 ± 0.25 | S-VS |
| 6.95 ± 0.25 | S-VS | where,
VS = 50–100
S = 30–70
M = 15–50
W = 5–30

ETS-6 is disclosed in U.S. Ser. No. 09/640,313, the entire contents of which are herein incorporated by reference. Other titanium silicates can be formed into membranes and used in fluid (gas and liquid) separation in accordance with this invention, including ETS-10 and ETAS-10.

The titanium silicate molecular sieves can be produced as membranes by any technique known in the art, including methods known in the art for production of zeolite membranes. The membranes can be unsupported or supported on a porous metal or ceramic and the like. For example, the titanium silicate membranes can be formed from hydrothermal synthesis using aqueous solutions of the titanium silicate precursors spread against a substrate surface to form the membrane layer. Likewise, gels of the titanium silicate precursors can be spread across a surface and the gel precursors again heat treated to form the appropriate titanium silicate molecular sieve. Growth from solid precursors, such as shaped TiO$_2$ can be performed. Other methods include chemical vapor deposition which is also known in the art. Reference is made to U.S. Pat. No. 6,051,517 which sets forth numerous articles describing the preparation of zeolite membranes as well as U.S. Pat. Nos. 5,110,478; 5,100,596; 5,069,794; 5,019,263; 4,578,372; 4,699,892, all of which describe zeolite membrane preparation and are incorporated herein by reference. For this invention, the particular membrane-forming method is not believed to be critical. Any method can be used so long as the membranes are relatively free of defects so as to prevent passage of retentate across the membrane.

The present invention is also directed to a novel method of forming the titanium silicate membranes. Thus, it is preferred to form the titanium silicate membranes in-situ directly from $TiO_2$ or mixtures of $TiO_2$ with other species such as $SiO_2$. In this particular process, the solid titanium dioxide is simply immersed in or otherwise continuously contacted with an aqueous solution containing the other synthesis components including sodium silicate, sodium hydroxide and water and the mixture reacted at elevated temperatures sufficient for synthesis of the desired molecular sieve. A portion of the silicate reactant can also be included in solid form. It may also be useful to include seeds of the crystalline titanium silicate molecular sieve, which is to be formed into a membrane in the solid mix or added as a slurry to the liquid synthesis solution containing the other components.

This novel membrane-forming method is particularly useful inasmuch as the solid components such as the titanium dioxide, and any other optional solids such as silica or any seed titanium silicate crystals, can be pre-formed into any desired shape such as being pressed under heavy pressure and into consolidated thin films. Once the solid is formed into the desired shape, such as a desired thin film, the shaped titanium dioxide solid and optional solid components can be immersed in an aqueous solution containing the other components present in the correct amounts for the synthesis of the desired molecular sieve. Subsequent heating, typically at an elevated temperature such as between 150° C. and 350° C., preferably between 200° and 225° C. for 8 to 24 hours results in the in-situ formation of the desired crystalline titanium silicate molecular sieve in the form of the pressed preform such as a thin film membrane. When performing a seeded synthesis in which the solid titanium dioxide preform also includes a portion of the crystalline titanium silicate molecular sieve which is desired to be formed, anywhere from 1 to 40% by weight of the preformed consolidated solids can be the crystalline titanium silicate seed. Preferably, from about 5 to up to about 25 wt. % of the solid preform is the titanium silicate seed crystals. The crystalline titanium silicate molecular sieves, including ETS-4, have a density which is much lower than titanium dioxide. Accordingly, the titanium silicate crystals grow outward to fill gaps in the growing membrane. Fissures and other imperfections in the membrane can thereby be greatly minimized. While it is preferred to preform the titanium dioxide into thin films such as for use in membrane film separation, any size or shape membrane can be generated by preforming the precursor solid mixture including titanium dioxide and optional solids such as silica and titanium silicate seed crystal.

The titanium silicate molecular sieve membranes of the present invention can be utilized in any process known to separate one molecule from another whether in the liquid or gaseous state. In the preferred embodiments of this invention, ETS-4 and its contracted versions, CTS-1, are used in the form of membranes to separate gaseous molecules which have a size difference of 0.1 Å or more. This is possible since the pore size of the CT-1 material can be precisely controlled by shrinking the pores of ETS-4 upon thermal treatment. The pores of the CTS-1 material can be frozen in place at a particular size by stopping the thermal treatment and cooling to ambient temperature.

One particular preferred use of the titanium silicate molecular sieve membranes, and, in particular, the CTS-1 membranes, is the separation of small polar species such as $CO_2$, $H_2O$, $N_2$, $H_2S$ and even $SO_2$ from hydrocarbons such as raw natural gas at mildly elevated temperature and full natural gas pressure. In 1993, the Gas Research Institute (GRI) estimated that 10–15% (about 22 trillion cubic feet) of the natural gas reserves in the U.S. are defined as sub-quality due to the contamination with nitrogen, carbon dioxide, and sulfur. Nitrogen and carbon dioxide are inert gases with no BTU value and must be removed to low levels, i.e. less than 4%, before the gas can be sold. The purification of natural gas usually takes place in two stages in which the polar gases such as $CO_2$, $H_2S$ and water are removed prior to nitrogen removal. Generally, $CO_2$, $H_2S$, and $H_2O$ removal are currently performed using three separate systems including acid gas scrubbers for removal of $H_2S$, $SO_2$ and $CO_2$, glycol dehydration, and molecular sieve dehydration. At present, nitrogen removal is typically limited to cryogenics. A cryogenic process is expensive to install and operate, limiting its application to a small segment of reserves. For example, a nitrogen content of higher than 15% is needed to render the process economical. While proposed pressure swing adsorption processes utilizing titanium silicate molecular sieves are being developed by the present assignee, such processes up to this time have also relied on removal of polar gases prior to contacting the nitrogen-containing natural gas with the adsorbent. Further, as previously described, these PSA systems are costly to build and to operate.

It is believed possible that with the titanium silicate membranes of this invention, in particular, with the use of CTS-1 membranes, natural gas purification can be substantially accomplished in one step. This one step process is depicted in FIG. 1. As shown therein, a raw natural gas stream is directed to a CTS-1 membrane which has been formed from thermally treated ETS-4 or an ETS-4 membrane with appropriate cation so as to have a pore size in the range of from 3.6–3.7 Å. The raw natural gas stream, methane, contains impurities in the form of polar species such as carbon dioxide, hydrogen sulfide, water, and other impurities such as nitrogen and higher hydrocarbons such as $C_2$–$C_7$ alkanes. Methane, which has a size of 3.8 Å and the higher hydrocarbons cannot pass through the pores of the CTS membrane and form the retentate product. The polar species, smaller than methane, have a size of at most 3.6 Å and are able to pass through the pores and across the plane of the membrane as permeate product. It is preferred to heat the gas at temperatures of about 50–125° C., as it has been found that at these mildly elevated temperatures, the polar species more readily pass through the pores of the titanium silicate membrane. As can be seen in FIG. 1, the use of the titanium silicate membrane purifies natural gas (methane) in one step, wherein the polar species and other low heat value materials ($N_2$) can be made to pass through the membrane by controlling the pore size thereof and removed as permeate by methods known in the art of membrane technology. The product natural gas stream can be collected as retentate and removed from the upstream side of the membrane, again, by methods known in the membrane technology.

Another important use of the titanium silicate membranes of this invention is in the formation of enriched oxygen streams with an oxygen purity of at least 30%. Such oxygen enriched streams could be used in a variety of applications including, for example, providing economical, transportable medical oxygen for those with respiratory difficulty, as well as in various combustion applications including diesel engines, enabling a cleaner, more economical combustion process. Enriched oxygen could also lead to more efficient production of pure oxygen and nitrogen by pre-enriching the air streams that enter conventional cryogenic oxygen plants. Dramatic increases in combustion engine performance are possible given the cost effective approach to oxygen enrichment. Expansion of on-site oxygen applications, such as enhanced engine/furnace combustion, will require a dramatic change in air separation technology. Thermodynamically driven $N_2$ selective adsorbents have not proven fast enough for such applications.

Current technology for providing enriched oxygen streams includes cryogenics, PSA, vacuum swing adsorption, VSA and VPSA technology as well as nitrogen membranes. Cryogenic distillation produces very pure (99.999% pure) oxygen (in either liquid or gaseous form) that is then back diluted with air. The high capital and operating cost of cryogenics makes this applicable only in high purity, high pressure or high volume (greater than 150 tons per day) uses. Current VSA technology, using carbon molecular sieves, can produce enriched oxygen at costs approaching $25/ton but rate of oxygen generation and robustness of the adsorbent limit its applications.

Nitrogen membranes can also be used to produce enriched oxygen streams with oxygen purities of 40%, however, these units suffer from flux limitations as well as contamination issues that restrict their use to lower volume applications. Membranes must also be kept free of moisture which requires some pre-drying or heating of the air prior to entering the membrane systems. The titanium silicate molecular sieve membranes of this invention have great potential value in providing a simplified method of forming enriched oxygen streams.

Figure 2:
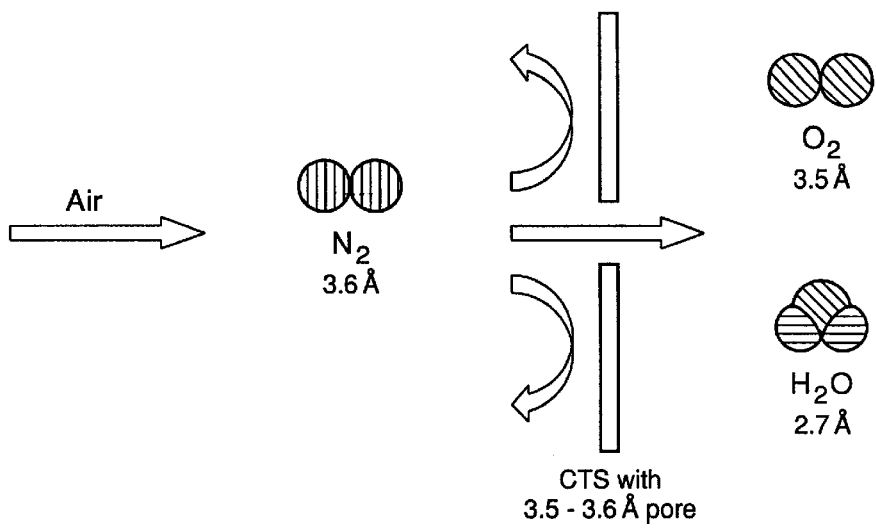
FIG. 2 is a depiction of a separation process using titanium silicate membranes for enriching air with oxygen.

Air separation utilizing the CTS titanium silicate membranes of this invention is shown in FIG. 2. It is important to note that since polar molecules such as water bind much more weakly on the titanosilicate molecular sieves than classical zeolites, these polar species are relatively mobile at mildly elevated temperatures of 50–125° C. Accordingly, raw, humid air can be treated with the titanium silicate membranes such as of the CTS type. Thus oxygen and water readily penetrate a CTS pore of approximately 3.5–3.6 Å as permeate while the passage of the larger $N_2$ species is prevented by size exclusion. The membrane separation process of this invention is a one-step separation of air without pre-drying as is the case with many polymeric membranes which can be degraded by moisture. Referring to FIG. 2, it can be seen that raw air can be divided between its larger nitrogen component having a size of 3.6 Å as retentate from the smaller oxygen at 3.5 Å and polar water at 2.7 Å which are separated as permeate product. The CTS membrane is formed from ETS-4 by thermal treatment to provide a pore size of 3.5–3.6 Å.

The titanium silicate membranes of this invention can be used in many other separation processes. The membranes can be used in the removal of argon from oxygen, sulfur dioxide removal from refinery gas or wet gas streams including raw stack gas or natural gas stream. Additionally, the precisely tailorable pore size of the CTS membrane would appear to be useful for separation of small hydrocarbons. Further separations include, in general, separation of mixtures including one or more molecular species having a diameter of 3 or more Angstroms from one or more molecular species having diameters of less than 3 Angstroms. Separation of water from air ($O_2$ and/or $N_2$), hydrogen from carbon monoxide and/or carbon dioxide, ammonia from hydrogen sulfide, etc. are a few non-limiting examples.

Figure 3:
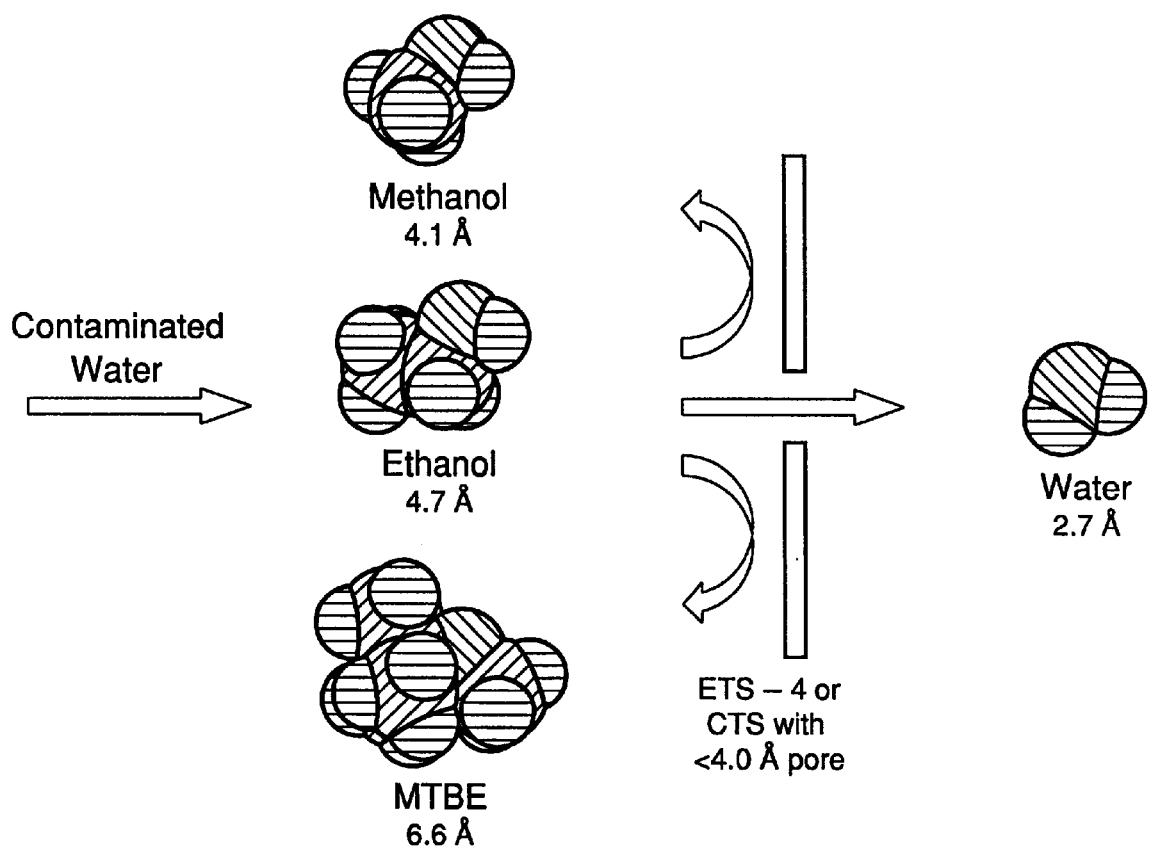
FIG. 3 is a depiction of a separation process using titanium silicate membranes for removing organic compounds from water.

While the titanium silicate membranes of this invention are useful for gas separations as described above, the use of titanium silicate membranes in liquid separations is also part of this invention. Non-limiting examples of liquid-liquid separations, which can be achieved by the titanium silicate membranes of this invention include the removal of organic, metallic and inorganic salt compounds from aqueous solution. For example, the porous, crystalline titanium silicate membranes can be used to separate halogenated solvents such as chloro-, fluro-, chlorofluro- or other halogenated hydrocarbons such as may be used in aqueous inks, paints, dry cleaning solvents, and general purpose solvents, etc., so as to recover the valuable solvent components and/or removal of contaminant halogenated organics from aqueous streams. Likewise, non-polar organic components such as aliphatic and aromatic hydrocarbons, such as gasoline components, e.g. $C_{5+}$ aliphatics and benzene can be removed from aqueous solution or from each other depending upon the size of the pores of the titanium silicate used. The separation of polar organic molecules, such as methanol, ethanol from water has important commercial applications. A particularly useful separation involving titanium silicate membranes of the present invention is the removal of methyltertiarybutylether (MTBE) from contaminated ground water such as resulting from the leakage of gasoline storage tanks. FIG. 3 illustrates the separation of methanol (4.1 Å), ethanol (4.7 Å) or MTBE (6.6 Å) from water (2.7 Å) using an ETS-4 or CTS membrane. The removal of anionic metallocompounds, such as complexes of chromium, selenium and arsenic can be achieved and result in the removal of contaminant metals from ground water and as well provide separation of such metallocompounds from industrial aqueous streams to provide clean aqueous effluents as well as provide recovery of precious metal constituents. Similarly, the titanium silicate membranes can be used to remove inorganic salts such as sodium chloride, metal sulfates, etc. from ground water and manufacturing streams such as from paper or paperboard making.

A particularly useful titanium silicate would be ETS-4 which has an average pore diameter of about 4 microns which will allow water having the size of 2.7 Å to pass through while retaining larger molecules. Importantly, ETS-4 can be converted to CTS-1 so as to control the pore size from a maximum of 4 Å to about 3 Å, small enough to retain contaminant or recoverable species and allow such species to be separated from aqueous solution. Importantly, the titanium silicate membranes of this invention readily allow the passage of the polar water species therethrough, unlike the conventional aluminosilicate molecular sieves which ionically attract and hold polar species such as water.

EXAMPLE 1

A titanium silicate membrane formed of ETS-4 was formed in the following manner. 0.29 grams of $TiO_2$ was pressed into a disk with a diameter of 13 mm and a thickness of 1 mm under 6 tons of pressure. The $TiO_2$ is P25 (Degussa) and contains 76 wt. % anatase and 24 wt. % rutile.

A synthesis liquid was made from:

3.83 grams N-brand sodium silicate 0.60 grams 50% NaOH solution 3.04 grams deionized water The solution of synthesis liquid was mixed well and placed in a Teflon autoclave liner (capacity about 15 ml.).

The titanium dioxide disk was submerged in the solution and the autoclave sealed. The titanium dioxide disk was submerged in the solution for sixteen hours under autogenous pressure at an oven temperature of 225° C. After removal of the disk from the solution, the disk was washed with hot water and dried at 100° C. XRD of the disk showed that it was formed of ETS-4.

EXAMPLE 2

An ETS-4 membrane similar to the one formed in Example 1 is used to separate an ethanol/water mixture. Permeation measurements are carried out at room temperature using the membrane submerged within an enclosed permeation cell. Recirculating flow is provided to ensure good mixing near the membrane surface. For permeation measurements at a given feed composition, three fractions of permeate are collected for at least six hours and up to twelve hours. The feed and permeate compositions are analyzed by gas chromatography. In the ethanol/water system, various compositions in the range of 10 to 90% water content are investigated. Selectivities for water in ethanol ($\alpha_{w/e}$) are calculated using the following equation (1). All selectivities $\alpha$ are between 200 to 400 showing selective passage of water through the membrane. Increasing the temperature increases water flux through the membrane without a decrease in selectivity.

$$\alpha_{w/e} = \frac{(\text{wt \% water/wt \% ethanol})_{permeate}}{(\text{wt \% water/wt \% ethanol})_{feed}} \quad (1)$$

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A method for removing organic and/or inorganic contaminants from an aqueous feed stream comprising contacting said aqueous feed stream with a membrane formed from a porous, crystalline titanium silicate, recovering a permeate rich in water and forming a retentate having a contaminant concentration greater than said aqueous feed stream said titanium silicate composed of six oxygen-coordinates octahedral which are connected three dimensionally by tetrahedral silicone oxide units or bridging titanium silicate units.

2. The method of claim 1, wherein said porous crystalline titanium silicate is selected from the group consisting of ETS-4, ETS-6, ETS-10, ETAS-10 and CTS-1.

3. The method of claim 2, wherein said porous crystalline titanium silicate is ETS-4.

4. The method of claim 3, wherein said ETS-4 is ion-exchanged with barium, calcium, strontium or mixtures thereof.

5. The method of claim 2, wherein said porous crystalline titanium silicate is CTS-1.

6. The method of claim 1, wherein said porous crystalline titanium silicate has an average pore size of up to 4 Å.

7. The method of claim 1, wherein said contaminant is an alcohol.

8. The method of claim 7, wherein said alcohol is ethanol.

9. The method of claim 1, wherein said contaminant is a halogenated solvent.

10. The method of claim 1, wherein said contaminant is an aliphatic hydrocarbon having five or more carbon atoms.

11. The method of claim 1, wherein said contaminant comprises an aromatic compound.

12. The method of claim 1, wherein said contaminant is MTBE.

13. The method of claim 1, wherein said contaminant comprises metallic compounds.

14. The method of claim 13, wherein said metallic compounds include arsenic.

15. The method of claim 13, wherein said metallic compound comprises chromium.

16. The method of claim 1, wherein said contaminant includes inorganic salts.

17. The method of claim 16, wherein said inorganic salts include chlorides, sulfates or sulfites.

18. The method of claim 1, wherein said aqueous feed stream comprises ground water.

19. The method of claim 1, wherein said aqueous feed stream comprises an industrial process stream.

20. The method of claim 1, further comprising recovering said contaminant.

* * * * *

UNITED STATES PATENT AND TRADEMARK OFFICE
CERTIFICATE OF CORRECTION

PATENT NO.    : 6,340,433 B1                                        Page 1 of 1
DATED         : January 22, 2002
INVENTOR(S)   : Kuznicki et al.

It is certified that error appears in the above-identified patent and that said Letters Patent is hereby corrected as shown below:

Column 13,
Line 44, add -- , -- (comma) after "stream".

Column 14,
Lines 1-2, delete "oxygen-coordinates octahedral" and substitute therefor -- oxygen-coordinated titanium octahedra --.
Line 3, delete "silicone" and substitute therefor -- silicon -- and delete "titanium silicate" and substitute therefor -- titanosilicate --.

Signed and Sealed this

Twentieth Day of August, 2002

*Attest:*

*Attesting Officer*

JAMES E. ROGAN
*Director of the United States Patent and Trademark Office*